United States Patent
Zhang et al.

(10) Patent No.: US 7,889,202 B2
(45) Date of Patent: Feb. 15, 2011

(54) TRANSPARENT MULTI-BUFFERING IN MULTI-GPU GRAPHICS SUBSYSTEM

(75) Inventors: Guofeng Zhang, Shanghai (CN); Xuan Zhao, Shanghai (CN)

(73) Assignee: VIA Technologies, Inc., Taipei (TW)

( * ) Notice: Subject to any disclaimer, the term of this patent is extended or adjusted under 35 U.S.C. 154(b) by 915 days.

(21) Appl. No.: 11/582,019

(22) Filed: Oct. 17, 2006

(65) Prior Publication Data

US 2007/0091098 A1    Apr. 26, 2007

Related U.S. Application Data

(60) Provisional application No. 60/727,668, filed on Oct. 18, 2005.

(51) Int. Cl.
*G06F 15/80* (2006.01)
*G06F 15/16* (2006.01)
*G06F 15/167* (2006.01)

(52) U.S. Cl. .................. 345/505; 345/541; 345/502

(58) Field of Classification Search ................ 345/539, 345/541, 502, 505
See application file for complete search history.

(56) References Cited

U.S. PATENT DOCUMENTS

| | | | | |
|---|---|---|---|---|
| 5,519,825 A | * | 5/1996 | Naughton et al. | 345/473 |
| 5,657,478 A | * | 8/1997 | Recker et al. | 345/503 |
| 5,801,717 A | * | 9/1998 | Engstrom et al. | 345/539 |
| 5,933,155 A | * | 8/1999 | Akeley | 345/536 |
| 6,075,543 A | * | 6/2000 | Akeley | 345/539 |
| 6,243,107 B1 | | 6/2001 | Valtin | |
| 7,522,167 B1 | * | 4/2009 | Diard et al. | 345/502 |
| 2002/0126122 A1 | * | 9/2002 | Yet et al. | 345/522 |
| 2005/0041031 A1 | * | 2/2005 | Diard | 345/505 |

* cited by examiner

*Primary Examiner*—Kee M Tung
*Assistant Examiner*—Robert Craddock
(74) *Attorney, Agent, or Firm*—K&L Gates LLP (57) ABSTRACT

This invention discloses a method and system for implementing transparent multi-buffering in multi-GPU graphics subsystems. The purpose of multi-buffering is to reduce GPU idle time. In one example, after rendering a first image by a first GPU in a back buffer, the first image is displayed by flipping to the back buffer. After that, the front buffer and back buffer are exchanged, and then shifting the back buffer and internal buffers in a predetermined sequence. A second image is rendered to current back buffer by a second GPU. The second image is displayed by flipping to a current back buffer. After that, the front buffer and back buffer are exchanged again, and shifting the back buffer and internal buffers again.

12 Claims, 8 Drawing Sheets

TRANSPARENT MULTI-BUFFERING IN MULTI-GPU GRAPHICS SUBSYSTEM

PRIORITY DATA

This application claims the benefits of U.S. Patent Application Ser. No. 60/727,668, which was filed on Oct. 18, 2005 and entitled "Smart CPU Sync Technology for MultiGPU Solution."

CROSS REFERENCE

This application also relates to U.S. Patent application entitled "METHOD AND SYSTEM FOR DEFERRED COMMAND ISSUING IN A COMPUTER SYSTEM", U.S. Patent Application entitled "EVENT MEMORY ASSISTED SYNCHRONIZATION IN MULTI-GPU GRAPHICS SUBSYSTEM", and U.S. Patent Application entitled "METHOD AND SYSTEM FOR SYNCHRONIZING PARALLEL ENGINES IN A GRAPHICS PROCESSING UNIT", all of which are commonly filed on the same day, and which are incorporated by reference in their entirety.

BACKGROUND

The present invention relates generally to computer graphics processing, and, more particularly, to multi-buffering for operating multi-GPU graphics subsystems in a computer system.

In many computer systems with advanced graphics processing capabilities, the graphics processing subsystem includes a double buffering module. The double buffering module has two memory sections, i.e., a front buffer and a back buffer. The front buffer stores fully rendered images and supplies the images to a display driver. The back buffer stores images that are in the process of being rendered by a graphics processor. Once rendering to the back buffer is completed, and the front buffer image is in full display, the front and back buffers can be flipped. As such, the previous front buffer now becomes a back buffer and can store a new image as it is rendered, while the previous back buffer provides the newly rendered image it stored for display. The front and back buffers continually flip in this manner and at the same rate as that of the display refreshing (e.g., 50 Hz, 60 Hz, 75 Hz or 90 Hz). The buffer flipping has also to be in synchronization with the rendering speed, so that image tearing does not occur.

Figure 1:
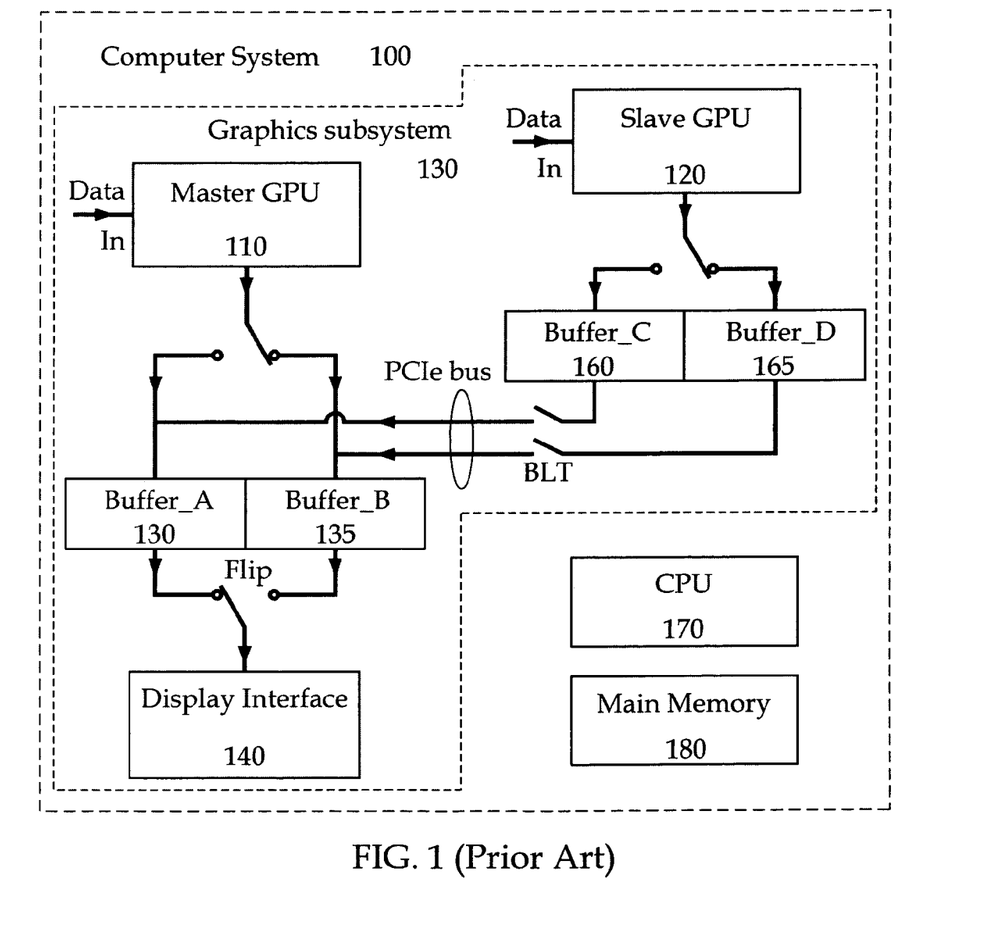
FIG. 1 is a block diagram of a part of a traditional computer system with two graphics subsystems that employ double buffering.

When a computer system employs more than one graphics processing unit (GPU), coordination among the GPUs and their buffers needs to use yet another technology or process, called bit-block-transfer (BLT), that is to combine two bitmap patterns from two buffers into one. FIG. 1 shows a two GPU system, with a master GPU does flipping and a slave GPU does BLT through a PCIe bus connection.

Double buffers with one for display and the other one for rendering, are only good for single GPU systems. When there is more than one GPU doing rendering, obviously there will be more rendered images than two buffers can handle, so that GPUs will be forced to halt rendering or idle from time to time, which then lowers the performance of the graphics subsystem.

It is therefore desirable for a multi-GPU computer system not to have idle time in any of its GPUs to fully appreciate the processing power offered by the multiple GPUs. What is needed is an improved method and system for enhancing the collective processing power of the computer system.

SUMMARY

In view of the foregoing, this invention provides a method and system for doing transparent multi-buffering, i.e., rendered images are handled internally through multiple buffers that reduces idle time in GPUs, yet external application programs still see no difference.

In one example of the present invention, after rendering a first image rendered by a first GPU in an external back buffer, the first image is displayed by flipping to the external back buffer. After that, the back buffer is changed to a front buffer and the original front back is changed to back buffer, the external back buffer and front buffer are from application double buffer implementation. A second image is rendered by a second GPU to an internal buffer, and shifting the external back buffer and internal buffers in a predetermined sequence. Through this way, the internal buffers replace the external back buffer and front buffer in a rotating way. Through an application view, it is still a double buffer, but from a driver point of view, there are more buffers.

The construction and method of operation of the invention, however, together with additional objectives and advantages thereof will be best understood from the following description of specific embodiments when read in connection with the accompanying drawings.

DESCRIPTION

Detailed information with regard to the operation of the GPU in the computer system is further described in U.S. Patent application entitled "METHOD AND SYSTEM FOR DEFERRED COMMAND ISSUING IN A COMPUTER SYSTEM", U.S. Patent Application entitled "EVENT MEMORY ASSISTED SYNCHRONIZATION IN MULTI-GPU GRAPHICS SUBSYSTEM", and U.S. Patent Application entitled "METHOD AND SYSTEM FOR SYNCHRONIZING PARALLEL ENGINES IN A GRAPHICS PROCESSING UNIT", all of which are commonly filed on the same day, and which are incorporated by reference in their entirety.

FIG. 1 shows a computer system 100 with two graphics subsystems 110 and 120 of a traditional double buffering. A master GPU 110 renders images into buffer_A 130 and buffer_B 135. The images are then flipped to a display interface 140 which directly fetches data from the buffers for display. A slave GPU 120 renders images into buffer_C 160 and buffer_D 165. The images are then bit-block-transferred (BLT) to buffer_A 130 and buffer_B 135 alternatively. Normally the master and slave GPUs render images alternatively, i.e., if the master renders frame[i], then the slave renders frame[i+1], and then the master renders frame[i+2], and so on so forth.

Figure 2:
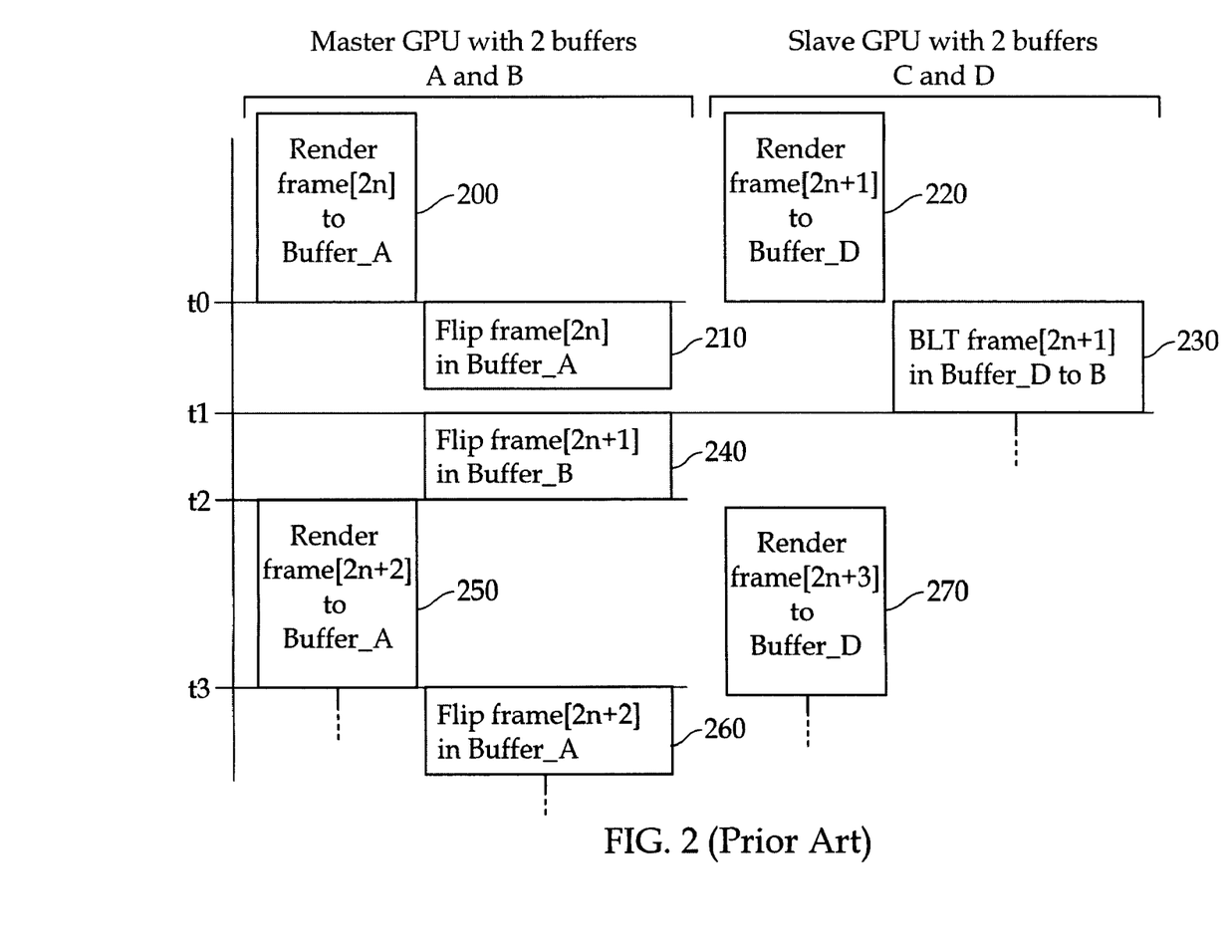
FIG. 2 is a timing diagram of the GPU operations in the traditional double-buffering computer system.

FIG. 2 is a timing diagram showing the deficiency of GPUs in a double-buffer graphics subsystem of FIG. 1. After a master GPU rendering a frame[2n] to buffer_A in time slot 200, a driver flips the frame[2n] into a front buffer in time slot 210. Meanwhile a frame[2n+1] rendered by a slave GPU in time slot 220 is bit-block-transferred to a master GPU's buffer_B in slot 230. Buffer_B is then flipped to be a front buffer in time slot 240, displaying frame[2n+1]. The master GPU can only render a subsequent frame[2n+2] into buffer_A after flip 240 completes. Because before flip 240 completely turns buffer_B into a front buffer, buffer_A is still a front buffer with its image in display, the master GPU cannot render any image into a front buffer. So that time slot 250 has to follow time slot 240. The time interval between time instance t0 and t2 is an idle time for the master GPU.

Figure 3:
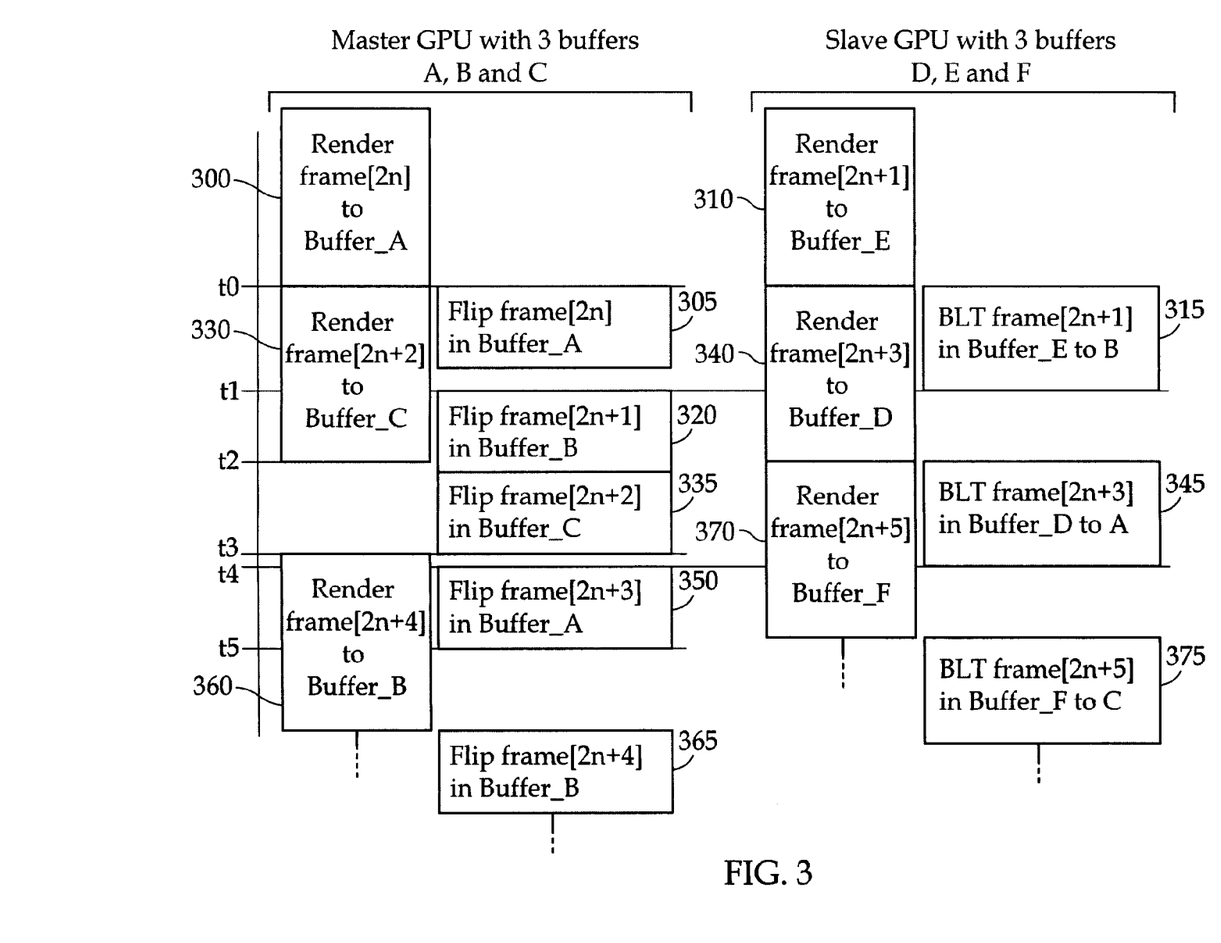
FIG. 3 is a timing diagram illustrating a three buffer system that eliminates some of the GPU idle time according to one embodiment of the present invention.

FIG. 3 is a timing diagram of a three-buffer-two-GPU graphics subsystem according to one embodiment of the present invention. Rendering frame[2n+2] to buffer_C in time slot 330 does not wait for any flip operation, so that the time slot 330 follows time slot 300 immediately. However, rendering frame[2n+4] to buffer_B in time slot 360 still have to wait for flip frame[2n+2] in time slot 335 to finish, because of the same reason that no new rendering to a front buffer as in the aforementioned two-buffer subsystem. So the three-buffer graphics subsystem only partially eliminates GPU idle time.

Figure 4:
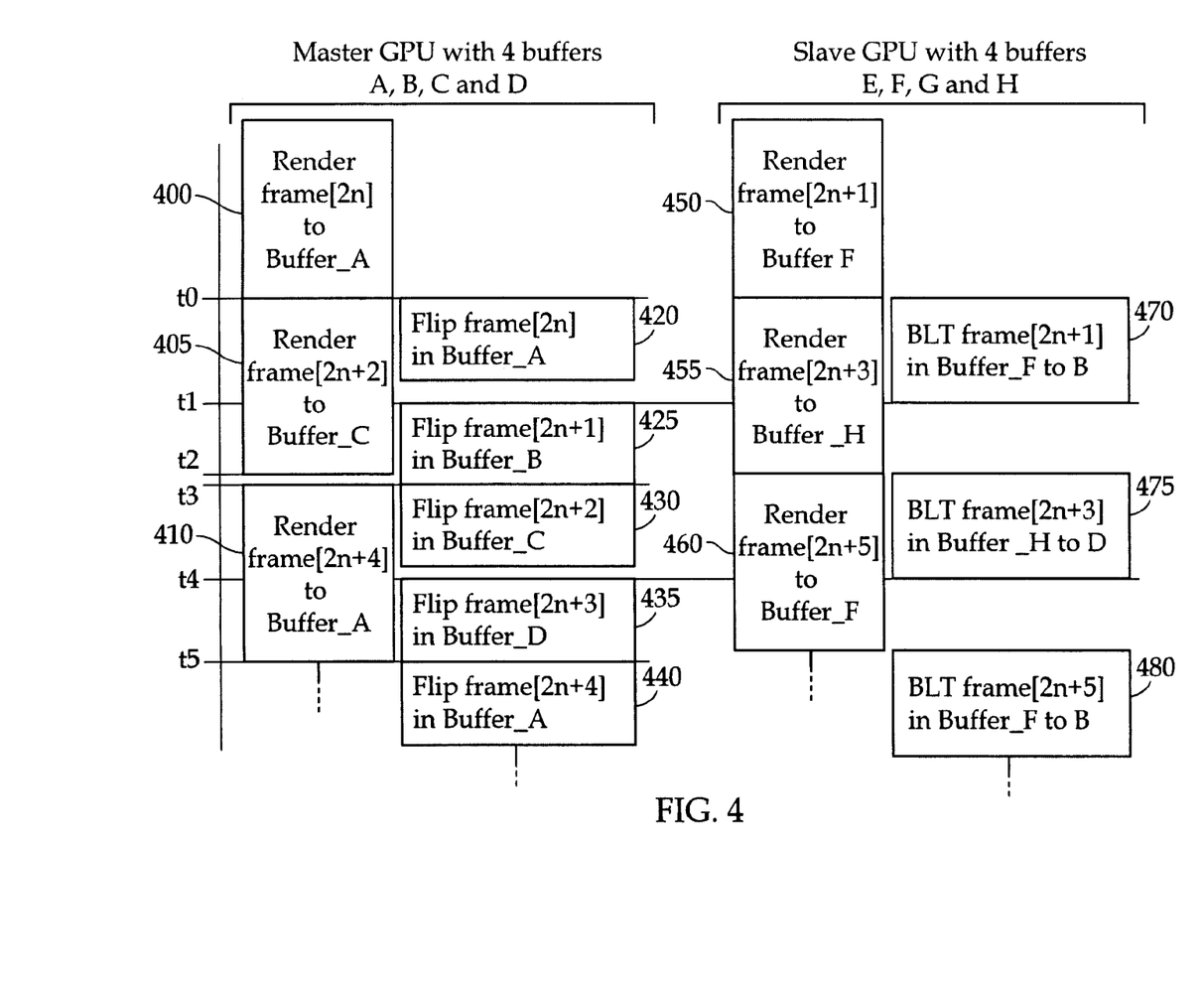
FIG. 4 is a timing diagram illustrating a four buffer system that further reduces the GPU idle time according to another embodiment of the present invention.

FIG. 4 presents a four-buffer-two-GPU graphics subsystem according to another embodiment of the present invention. Master GPU's idle time between frame[2n+2] and frame[2n+4] renderings in time slot 405 and 410, respectively, are also greatly reduced. In fact, the idle time can be eliminated if flip time in time slot 420 and 425 are short enough comparing to rendering in time slot 405.

It is clear now that by adding more buffers to a two-GPU graphic subsystem, the GPU idle time can be reduced or even eliminated. But if letting a driver handle a multi-buffer-multi-GPU graphics subsystem in a normal way as shown in FIG. 2 through 4, the driver logic will be relatively complicated. So one embodiment according to the present invention employs driver logics of shifting buffers at the end of flips, as shown in FIG. 5 and 6, to make internal multi-buffering transparent to external application programs.

Figure 5:
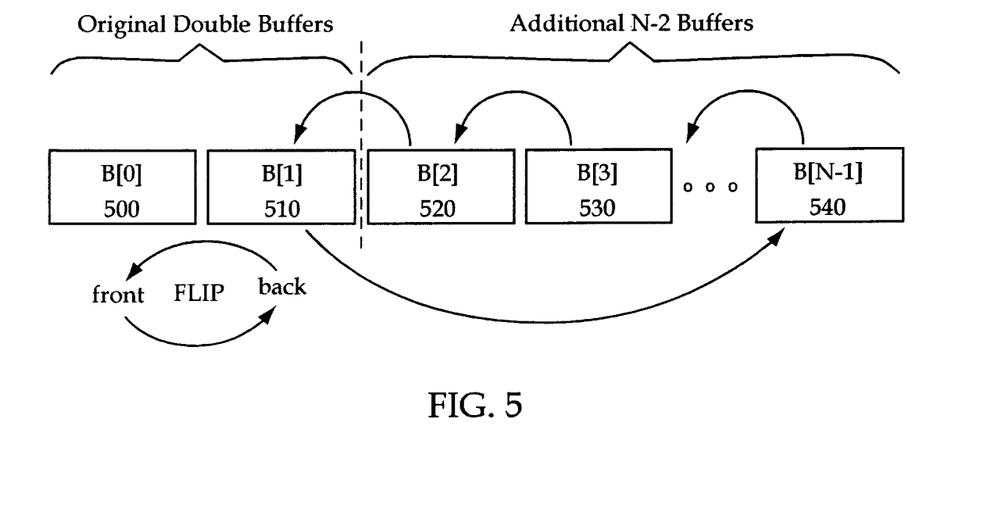
FIG. 5 is a block diagram showing buffer content shifting in a transparent multi-buffering system according to one embodiment of the present invention.
Figure 6:
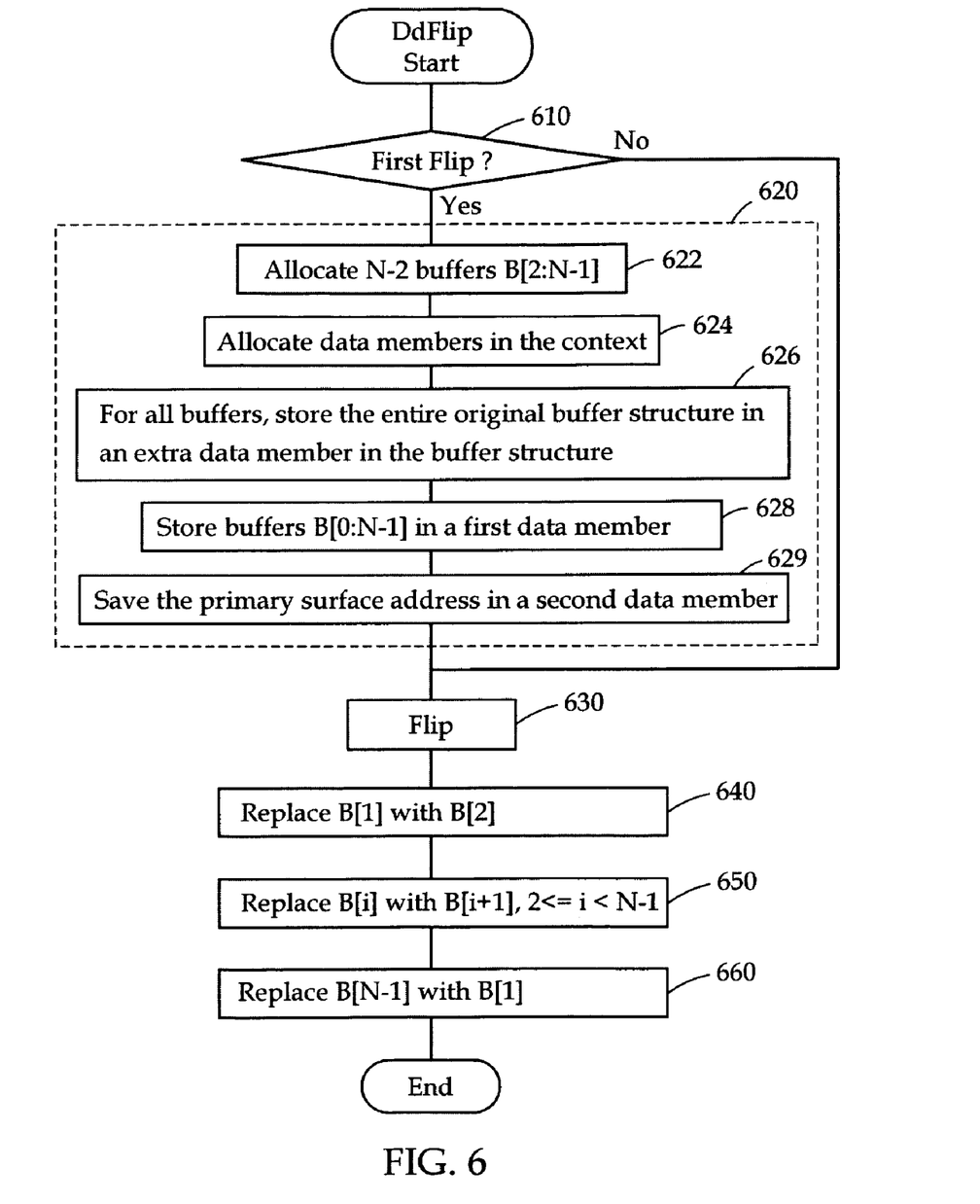
FIG. 6 is a flow chart illustrating an implementation of buffer content shifting in a DDFlip function according to one embodiment of the present invention.

Refer to FIG. 5, B[0] 500 and B[1] 510 are two original double buffers for the graphics subsystem, and flips are only executed between these two buffers. B[2] 520 through B[N−1] 540 are additional N-2 buffers. A the end of a flip execution, B[1] 510 is replaced by B[2] 520, and more generically, B[i] is replaced by B[i+1] where 2<=i<N−1, and the last buffer B[N−1] 540 is replaced by B[1] 510.

The aforementioned replacing is to replace the content of the data structure that presents the buffer. As the application and the OS refers to buffers using a pointer to the buffer structure, by replacing the buffer structure content, the driver replaces a buffer with another one, while the application and the OS still think it is the original buffer. So, after a replacing, B[1] is the original B[2], B[I] is the original B[I+1] and B[N−1] is original B[2]. And after a flip, B[0] is original B[1] and B[1] is original B[0]. In such a way, even though only the original double buffers, B[0] 500 and B[1] 510, seem available for rendering and display in a double buffer graphics subsystem, the internal buffers, B[2] 520 through B[N−1] 540, are also available for rendering and display, which are transparent to the application and the OS.

Following is an example of a three-internal-buffer implementation to illustrate the sequence of the buffer exchanges. Assuming the original double buffers to be buffer A and buffer B. and the three internal buffers are C, D, and E. Before a first flip, the front buffer B[0] is A, and the back buffer B[1] is B, and B[2], B[3] and B[4] are: C, D and E, respectively. After the first flip, the front Buffer B[0] is B, the back buffer B[1] is A. After a shifting, the front Buffer B[0] is B, the back buffer B[1] is C, and B[2], B[3] and B[4] are D, E and A, respectively. After a second flip, the front Buffer B[0] is C, the back buffer B[1] is B. After another shifting, the front Buffer B[0] is C, and the back buffer B[1] is D, and B[2], B[3] and B[4] are E, A and B, respectively.

Note that in the above example and in general, newly rendered buffers are always at the end of the array B[2:N−1], and the oldest buffers are always at the beginning of the array B[2:N−1]. Therefore, the B[2] is the buffer most ready for rendering buffer, every time it is the B[2] that is shifted to the back buffer B[1].

Referring to FIG. 6, a flow diagram is shown to illustrate the process according to one embodiment of the present invention in connection with the operation of Microsoft Windows DdFlip function. When a flip is checked to see whether this is a first flip in step 610, then in an initialization step 620, a driver allocates additional N−2 buffers B[2:N−1], allocates two data members in a context, with a first member to store pointers to buffers B[2:N−1], and a second member to save a primary surface address. Here the context is circumstances under which a device is being used, and a context structure contains processor-specific register data. A system uses context structures to perform various internal operations, and a primary surface is the buffer the OS uses as a desktop display. Also, the driver will allocate an extra member in the buffer structure to store the original buffer content for all buffers including external front and back buffer and internal buffers B[2:N−1].

After the initialization 620, the driver carries out a flip in step 630. Then steps 640 through 660 are to shift buffer structure contents between B[1] and B[2:N−1].

Figure 7:
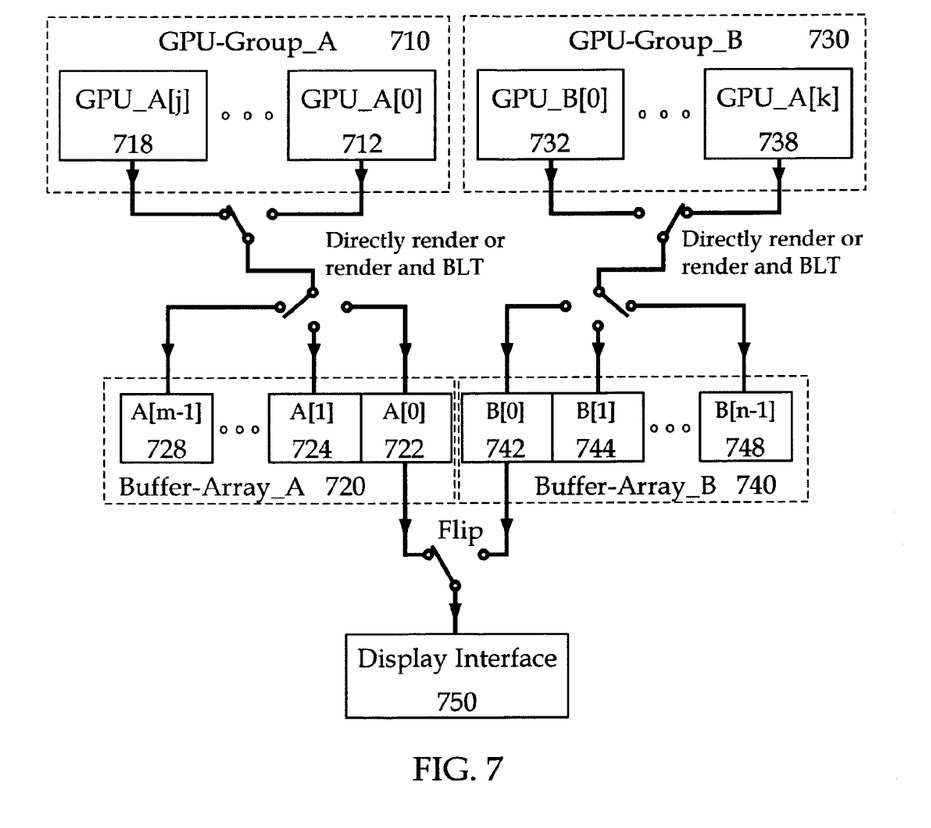
FIG. 7 is a block diagram showing components of a broader applied transparent multi-buffering system according to one embodiment of the present invention.

The transparent multi-buffering of the present invention can also be implemented in a graphics subsystem with two buffer arrays involved in the buffer structure content shifting described above according to another embodiment of the present invention, as shown in FIG. 7. A GPU-Group_A 710 has multiple GPUs, GPU_A[0:j] 712~718, which render images to Buffer-Array_A[1:m−1] 724~728, and then shift buffer structure contents the same way as described above after each flip to buffer A[0] 722. Such operation is mirrored to GPU-Group_B 730 and Buffer-Array_B 740. The flip is between A[0] 722 and B[0] 742, which are not switched, so the application programs treat the graphics subsystem just as a double-buffering one of the conventional art.

Figure 8A:
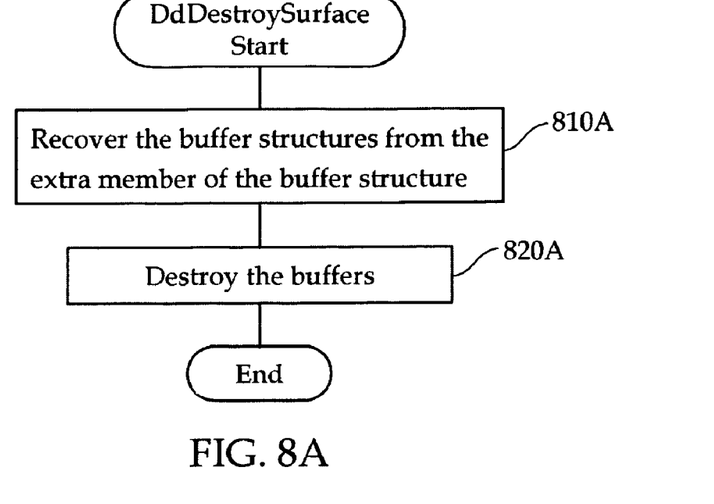
FIGS. 8A and 8B are flow charts showing steps taken to complete transparent buffering in a Windows operating system environment according to one embodiment of the present invention.
Figure 8B:
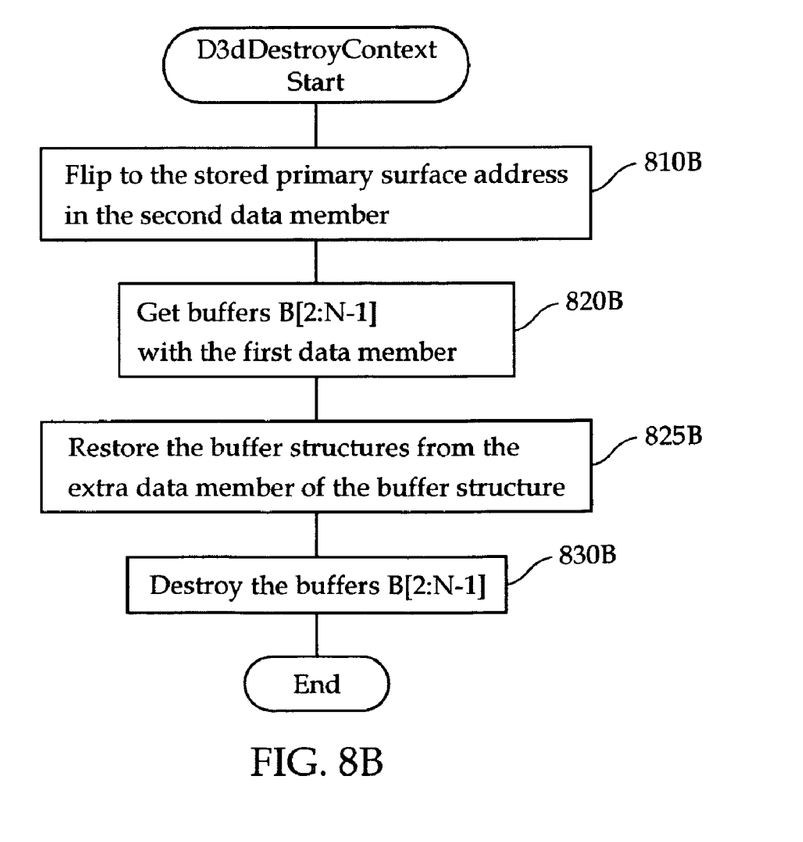

At the end of a drawing program, the driver needs to carry out two destroy functions, such as DdDestroySurface and D3dDestroyContext, both of which are also Microsoft Windows functions, as shown in FIG. 8A and FIG. 8B, respectively. To complete the task of hiding the internal multi-buffering, further driver logics are added to these functions as well.

FIG. 8A is a flow chart for performing DdDestroySurface function, where a step 810A is added to recover the surface structures from what have been saved in the first data member during the initialization step 620 of FIG. 6.

FIG. 8B is a flow chart for performing D3dDestroyContext function, where three steps 810B, 820B and 825B are added. Step 810B is to flip to the original primary surface address stored in the second data member. Step 820B is to get buffers B[2:N−1] through the pointer stored in the first data member during the initialization step 620 of FIG. 6. Step 825B is to restore the buffer structures through the extra data member of each buffer structure. In step 830B, the buffers B[2:N−1] are destroyed. With these steps inserted in the destroy functions to bring back the initial information for being destroyed, the driver can destroy all buffers correctly and restore the original primary surface.

This invention provides many different embodiments, or examples, for implementing different features of the invention. Specific examples of components and methods are described to help clarify the disclosure. These are, of course, merely examples and are not intended to limit the disclosure from that described in the claims.

What is claimed is:

1. A method for multi-buffering in a computer system with multiple graphics processing units (GPUs) for rendering images and displaying the same by flipping between two flip buffers, the method comprising:
    allocating one or more internal buffers for replacing contents of one of the two flip buffers with contents of one of the internal buffers at the end of a flip execution, wherein the internal buffers are additional buffers implemented in the GPUs in addition to the two flip buffers to provide more renderable buffers;
    rendering a first image by a first GPU to a back buffer of the two flip buffers;
    displaying the first image by flipping to the back buffer, after which a front buffer of the two flip buffers becomes a back buffer and the back buffer becomes a front buffer;
    shifting current back buffer and the internal buffers in a predetermined sequence;
    rendering a second image by a second GPU to the current back buffer, which has been replaced by one of the internal buffers;
    displaying the second image by flipping to the current back buffer, after which the front buffer and back buffer are exchanged; and
    shifting the current back buffer and the internal buffers again in the predetermined sequence, wherein the two flip buffers are shared by the first and second GPUs for displaying the rendered first and second images.

2. The method of claim 1, wherein the shifting buffers further includes:
    storing an entire original buffer structure in an extra data member in a buffer structure;
    storing original internal buffer structure contents in a first allocated data member; and
    storing an original primary surface address in a second allocated data member.

3. The method of claim 2, further includes allocating at least two data members in a context, and an extra data member in each buffer structure.

4. The method of claim 2, further comprising:
    recovering buffer structures with information stored in the extra data member in the buffer structure;
    flipping to the saved primary surface address in the second data member; and
    restoring the original buffer structure contents from the first data member.

5. The method of claim 1, further comprising:
    exchange the front buffer and the back buffer; and
    shifting buffer structure contents between the back buffer and the internal buffers after each flip.

6. A computer system comprising:
    two or more graphics processing units (GPUs) for rendering images including a first image and a second image;
    two or more flip buffers providing data for displaying the rendered first and second images by flipping between two flip buffers including a front buffer and a back buffer alternatively;
    one or more internal buffers, wherein the internal buffers are additional buffers implemented in the GPUs in addition to the two or more flip buffers for replacing contents of the back buffer with contents of one of the internal buffers at the end of a flip execution to get more renderable buffers; and
    a graphics driver for shifting one of the two flip buffers and the internal buffers,
    wherein the GPUs include a first GPU for displaying the first image by flipping to one of the two flip buffers and a second GPU for displaying the second image by flipping to another of the two flip buffers, and the two flip buffers are shared by the two GPUs for displaying the rendered first and second images.

7. The system of claim 6, further comprising:
    an extra data member in each buffer structure for storing an entire original buffer structure;
    a first allocated data member for storing pointers to internal buffers; and
    a second allocated data member for storing an original primary surface address.

8. The system of claim 6, further comprising:
    means for recovering buffer structures with information stored in the extra data member in the buffer structure;
    means for flipping to the saved primary surface address in the second data member; and
    means for getting the internal buffers through the pointers stored in the first data member.

9. The system of claim 6, wherein one or more internal buffers are associated to get more renderable buffers.

10. A system for supporting transparent multi-buffering in a computer graphics subsystem with multiple graphics processing units (GPUs) and at least two flip buffers including a front buffer and a back buffer, the system comprising:
    at least one internal buffer allocated for replacing contents of one of the two flip buffers at the end of a flip execution with contents of one of the at least one internal buffer and for providing more renderable buffers, wherein the internal buffer includes one or more additional buffers implemented in the GPUs in addition to the two flip buffers;
    a graphics driver for shifting one of the two flip buffers and the internal buffer; and at least one extra data member in each buffer structure to store original buffer structure content, and two data members allocated by the driver to store an initial information of a graphics subsystem for later being destroyed at an end of a drawing program, with one member to store pointers to the internal buffer and one to save original primary surface address, wherein the GPUs include a first GPU for displaying a first image by flipping to one of the two flip buffers and a second GPU for displaying a second image by flipping to another of the two flip buffers, and the two flip buffers are shared by the first and second GPUs for displaying the rendered first and second images.

11. The system of claim 10, wherein there are at least one internal buffer to shift with the back buffer to provide more renderable buffers.

12. The system of claim 10, wherein the drawing program is operating in a Windows operating system.

* * * * *